United States Patent [19]
Dreux

[11] Patent Number: 4,984,421
[45] Date of Patent: Jan. 15, 1991

[54] PROCESS AND MACHINE FOR HARVESTING FRUITS OR SIMILAR ITEMS SCATTERED ON THE GROUND

[76] Inventor: Maurice Dreux, Les Savignattes - Esglottes, 47120 Duras, France

[21] Appl. No.: 426,955

[22] Filed: Oct. 25, 1989

[30] Foreign Application Priority Data

Oct. 27, 1988 [FR] France .................. 88 14248

[51] Int. Cl.⁵ .......................................... A01D 51/00
[52] U.S. Cl. .................................... 56/328.1; 56/344; 56/DIG. 21
[58] Field of Search .................. 56/328.1, 344, 340.1, 56/DIG. 3, DIG. 5, DIG. 10, DIG. 21

[56] References Cited

U.S. PATENT DOCUMENTS 3,762,140  10/1973  Block .................. 56/328.1
3,879,923   4/1975  Granger ............... 56/328.1

FOREIGN PATENT DOCUMENTS 0201238  7/1983  Fed. Rep. of Germany ..... 56/340.1
2441327  6/1980  France .

Primary Examiner—Ramon S. Britts
Assistant Examiner—Terry Lee Melius
Attorney, Agent, or Firm—Harold H. Dutton, Jr.

[57] ABSTRACT

The invention relates to a process for harvesting fruit or similar articles on the ground. The process comprises driving the fruit ahead of rotating brushes (10–14, 32) which are displaced in the vicinity of the ground in such a manner as to cause each fruit to roll toward an edge of the brush for forming a window parallel to the direction of displacement, recovering said window on a receiving surface (34) positioned in such a manner as to extend to the vicinity of the edge of at least one bruch (32) and to convey toward a container the fruit recovered from said surface. The process of the invention permits gathering even fragile fruit without bruising them, either on damp ground or on dry ground.

17 Claims, 10 Drawing Sheets

PROCESS AND MACHINE FOR HARVESTING FRUITS OR SIMILAR ITEMS SCATTERED ON THE GROUND

This invention relates to a process and a machine for harvesting fruits or similar articles scattered on the ground. More particularly, the invention relates to the harvesting of fruit such as plums, walnuts, hazelnuts, apples, etc. fallen on the ground, but may also extend to the harvesting of any similar objects of a rounded form, scattered on a surface. To simplify the description, the term "fruit" will will be taken to have a more general meaning: "fruit or analogous articles."

BACKGROUND AND OBJECTS OF THE INVENTION

One type of machine is known for mechanical gathering, which is intended for gathering hard fruit such as walnuts. These machines are provided with metal combs which rake the surface, which makes these machines completely unadaptable for gathering more fragile fruit such as plums which would be subject to serious damage from this mechanical rake.

Another type of machine uses a powerful blast of air directed toward the ground for assuring a pneumatic transfer of the fruit toward a conveyor. However, this type of machine requires a significant pneumatic power; for fragile fruit they are carried along on the dry ground receiving bruises therefrom, while on damp ground, they are the cause of choking of the machine, making their passage difficult. Further, these machines have a tendency to accentuate the irregularities of the ground digging out swales and parts already dug up.

A type of machine has been proposed in which the gathering of the fruit is achieved by pairs of opposing brushes near the ground and rotating in opposite directions, in such a manner as to pinch the fruit, to lift it upwardly between the two brushes and to carry it toward a conveying system. This type of machine has been abandoned because of its deficiencies which are incompatible with a satisfactory operation: impossibility of gathering fruit in pockets in the ground, crushing of the fruit between the brushes, very difficult and problematical harvesting on damp ground.

The present invention proposes providing a new process for harvesting which permits gathering even fragile fruit without injuring it. It seeks to provide a machine permitting assuring a complete recovery of fruit both on wet ground as well as on dry ground.

DESCRIPTION OF THE INVENTION

To this end, the process according to the invention for gathering fruit or analogous articles scattered on the ground comprises:

driving the fruit ahead of at least one rotating projecting member having an elongated form extending above the ground, each projecting member being arranged in the vicinity of the ground in such a manner as to cause the fruit to roll toward one edge of said member for forming a windrow parallel to the direction of displacement, collecting said windrow on a receiving surface positioned in such a manner as to extend to the vicinity of the edge of at least one of the projecting members, and conveying the fruit gathered on said surface toward a container.

According to a preferred embodiment, each projecting member comprises a brush rotating about an axis parallel to the ground with a direction of rotation such that the leading part of the brush is displaced from the bottom to the top. Said brush is advantageously arranged in an oblique or angled position with respect to its direction of displacement so as to assure the accumulation of fruit toward the edge of the brush which is situated rearmost (with respect to this direction of displacement.)

Thus, according to the process of the invention, the fruit is driven or impelled ahead of at least one rotating member which causes the fruit to roll on the ground while forming a linear accumulation (a windrow) which is carried along by the receiving surface. This process does not use a pneumatic jet of air and is therefor free of all of the attendant problems; moreover, the delivery of each fruit by simple contact with a rotating member such as a brush may be achieved without damaging the fruit, contrary to the process of raking by combs which damages fragile fruit, or the process of ejection between two brushes which bruises the fruit.

According to another preferred embodiment, the process provides for simultaneously displacing several independent projecting members, positioned approximately along two lines:

a front or leading line where said members are arranged in such a manner as to cover a predetermined strip of ground in order to form two windrows, and a rear or trailing line comprising two members situated facing those two windrows and cooperating with the receiving surface which is arranged between said members.

Thus, the front projecting members achieve a first working of accumulating the fruit in two windrows, which permits thereafter the two rear projecting members to direct all of the fruit onto the receiving surface. This receiving surface and the wheels of the machine are arranged in alignment and at the rear of the front projecting members in such a manner as to be displaced on already swept ground, without risk of bruising the fruit. Further, this arrangement of several independent projecting members permits covering a large strip of land (in particular half the width between two rows of trees), while providing projecting members of reduced length assuring a correct positioning of each member above the ground at a distance less that the diameter of a fruit, in spite of the possible irregularities of the terrain.

According to another characteristic of the invention, the receiving surface on which the windrows are gathered comprises an endless belt having an active section extending on the ground, parallel to the direction of displacement, at the level of the edge of one or several projecting members. This belt is driven in a continuous rolling movement causing it to roll without sliding on the ground with a direction of rolling opposite to the direction of displacement of the projecting members. Thus, the fruit which rolls on the ground along a projecting member passes in a natural manner and without bruising to the belt when arriving near the edge of this member, since the active section of this belt is not subject to any sliding with respect to the ground and thus appears stopped with respect thereto (constituting a sort of extension of the ground in precise continuity therewith.) The belt is closed on itself by an ascending section, an upper return section and a descending section. The fruit carried by transverse pockets along the rising belt are then discharged at the upper part onto the conveyor means which transports them toward the container.

The invention extends to an agricultural machine for carrying out the above defined process, comprising a combination of the following means:

a frame adapted to be displaced in one direction;

at least one rotating projecting member, of an elongated form, carried by said frame in such a manner as to be situated in the vicinity of the ground in an oblique or angled direction with respect to the direction of displacement;

means for rotatably driving each projecting member, capable of animating its periphery with a movement assuring the projection of the fruit toward the front, a receiving belt carried by the frame and having an active section situated alongside the rear edge of the one or more projecting members in such a manner as to extend below and beyond said members, driving means for the receiving belt, able to confer on its active section a direction of travel opposite to the direction of displacement of the frame, and means for conveying the fruit from the receiving belt toward a container.

Each projecting member preferably comprises a brush formed of bristles fixed on a horizontal axle associated with a hydraulic drive motor.

According to another characteristic of the machine, each brush and its hydraulic motor are carried by a support which is articulated on the frame in order to be movable vertically and horizontally; this support is provided with a skid or slide plate contacting the ground for adjusting the height and permits the associated brush to follow the irregularities of the ground at an appropriate height for driving all of the fruit and avoiding a direct contact with the ground.

According to another characteristic of the machine, the receiving belt comprises a chassis carried by a hydraulic lifting apparatus adapted to permit a vertical displacement. This chassis is secured to said lifting apparatus by a double articulation pivotal about a longitudinal axis and a transverse axis in such a manner as to be able to pivot transversely and ahead of the rear. This double articulation confers on the belt, the active section of which rests on the ground, a double freedom of movement permitting it to follow the irregularities of the ground and to gather in a satisfactory manner the fruit propelled by the brushes, even on a very irregular ground surface.

The agricultural machine according to the invention may be associated with a tractor, or on the other hand may be self-propelled, having its own motor and four driving and steering wheels. In this latter version which will be preferred in practice, the fruit storage container is situated to the rear and the conveying means comprises, advantageously, a receiving hopper arranged in the angle formed by the rising section and the upper section of the belt so as to collect the fruit deposited at the changing of direction, a short transverse conveyor arranged to receive the gathered fruit at the extremity of the transverse conveyor and to transport the fruit to the rear container, and driving means for said transverse conveyor and said longitudinal conveyor.

BRIEF DESCRIPTION OF THE DRAWINGS

The invention having been described in its general form, the description which follows in reference to the accompanying drawings illustrates one embodiment. In these drawings which form an integral part of the present description.

DETAILED DESCRIPTION OF PREFERRED EMBODIMENTS

Figure 1:
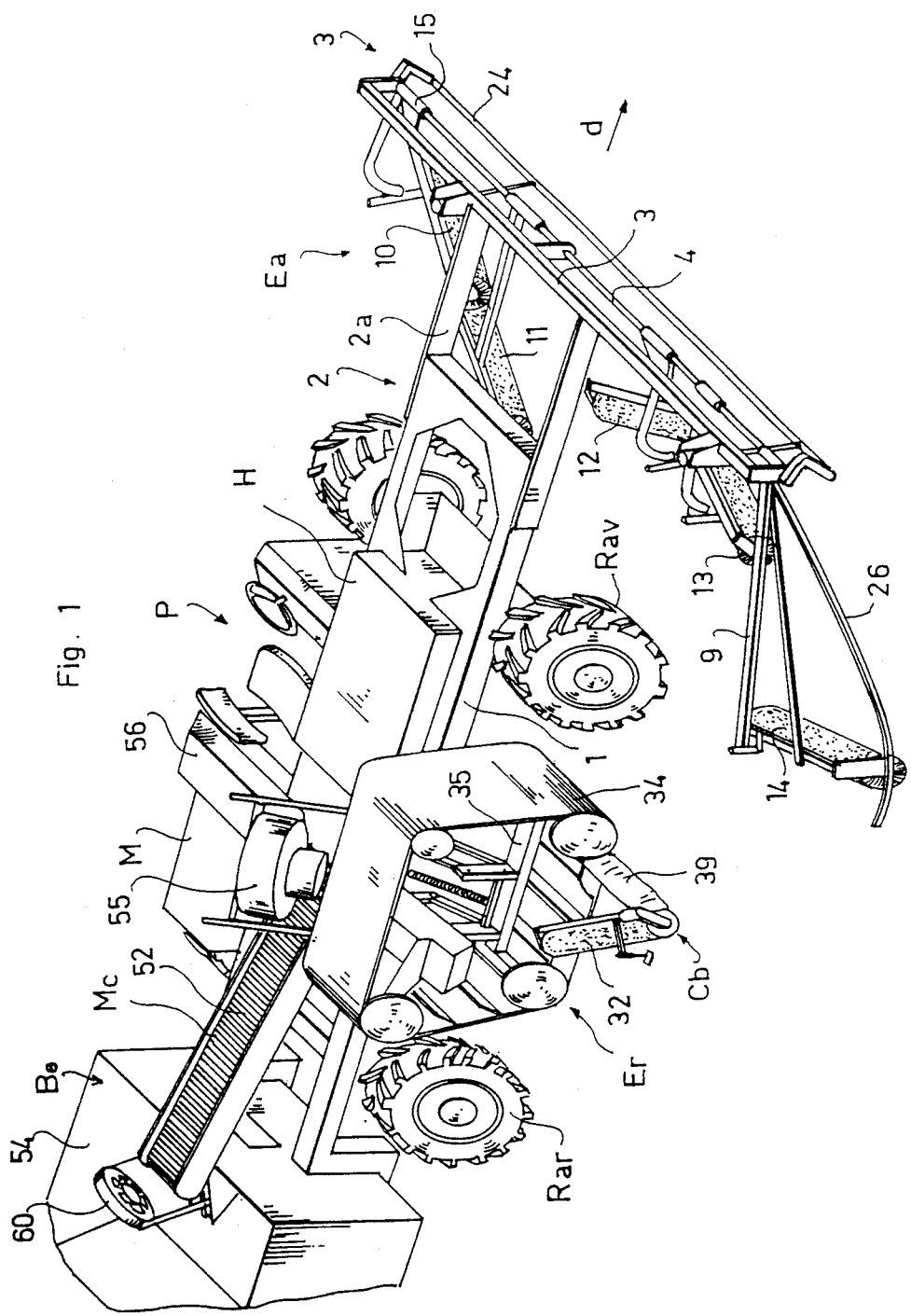
FIG. 1 is an assembly view in perspective of a harvesting machine according to the invention.

The agricultural machine shown by way of example in the drawings is intended to gather fruit fallen on the ground, particularly fragile fruit such as plums, in fields of aligned trees. It is sized to permit the harvesting in two passages the fruits scattered between two rows of trees, such as are shown symbolically at $L_1$ and $L_2$ in FIG. 11.

This machine comprises a frame 1 of the type similar to the frame of a tractor which is provided with various conventional equipment for making it self-propelled and self-contained: a combustion motor M, a driving station P, for driving and steering wheels $R_{AV}$ and $R_{AR}$, a central hydraulic system H with its reservoir, driven by the motor . . . . On this frame are mounted several assemblies specific to the invention which will be seen in the assembly drawings 1 and 2, and which are described in detail below: essentially a front assembly $E_A$ with five brushes intended to carry out a first accumulating work to form two windrows, a rear pair of brushes $C_B$ receiving the two windrows and cooperating with an assembly of the receiving belt $E_R$, conveying means $M_C$ for fruit gathered by the receiving assembly and a rear container Be.

The front assembly $E_A$ which is shown in detail in FIGS. 3, 4, 5 and 6, is carried by a chassis 2 which is fixed on the frame 1 and comprises, in front of the side members 2a, a transverse member 3. This member carries a lower horizontal rod 4 about which are articulated five brush supports: two left lateral supports 5, 6 carrying two lateral brushes 10 and 11, two central supports 7 and 8 carrying two central brushes 12 and 13, and a right lateral support 9 carrying a retractable lateral brush 14. Each brush support is articulated on the rod 4 by a sleeve such as 15 so as to vertically movable.

Figure 4:
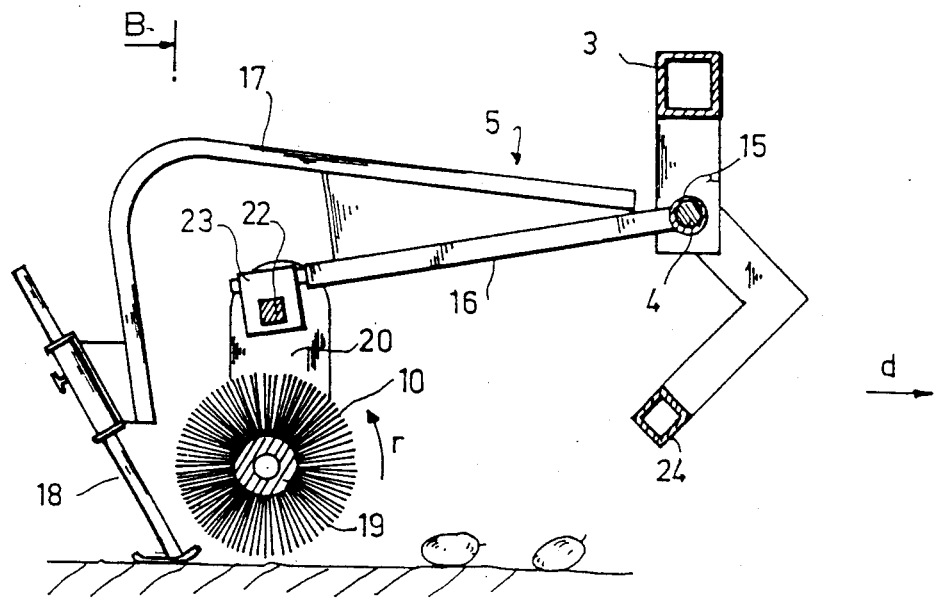
FIGS. 4 and 5 are detail views showing the mounting of a projecting brush and its ground skid plate, respectively in transverse section along line A and in rear cross section along line B.
Figure 5:
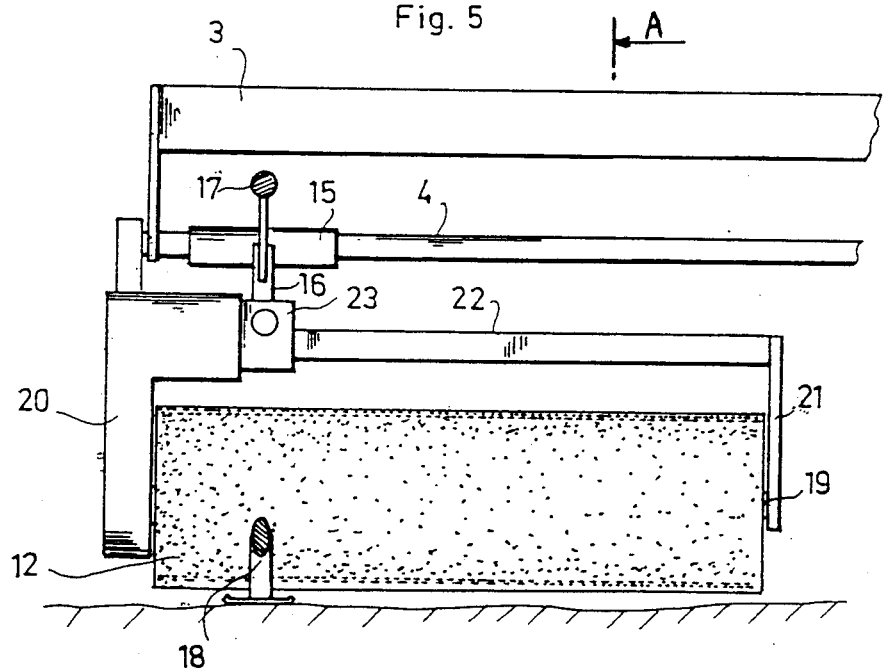

The supports 5, 6, 7 and 8 are similar and shown in detail in FIGS. 4 and 5. Each comprises a support bar 16 in an approximately longitudinal direction, and to the end of which is secured, through an articulation 23, the brush and its hydraulic motor, and a cross member 17 secured to the support bar 16 and carrying a skid plate 18 of adjustable height situated to the rear of the associated brush.

Each brush comprises a multitude of radial bristles, in particular of an non-wearing synthetic material, providing the bristles with a semi-rigid character, these bristles being fixed on an axle 19. This axle is coupled at one end to a hydraulic motor 20 and carries a bearing support at its opposite end extending from the hydraulic motor housing. The bar 22 carries the articulation 23 which permits the brush/motor assembly to pivot about the axis of the support bar 16 in such a manner as to be movable above the ground in a transverse plane. The balance of the assembly is provided in a manner so that each brush in its working position is positioned essentially horizontally above the ground at a constant height adjusted by the skid plate 18. This height may be adjusted to be on the order of $\frac{1}{3}$ D to $\frac{1}{2}$ D, where D is the diameter of the fruit being harvested (for example, a height of about 1.5 cm for plums of a diameter of about 3–4 cm). The brush follows the ground and its irregularities at a constant height by pivoting about the transverse rod 4 under the action of the skid plate 18. Further, in case of a local irregularity not detected by the skid plate, it may be displaced by the articulation joint 23.

The machine is also provided with hydraulic lifting means permitting the vertical displacement of the assembly of the leading brush supports between the working position near the ground and a raised position (transport position). This lifting means in the embodiment shown comprises a lifting bar 24, articulated at the ends of the rod 4 and on which act two hydraulic cylinders such as 25 (FIG. 3), permitting lowering this bar 24 toward the rear: in this movement, the lifting bar comes into contact with the support bars 16 and lifts them.

Figure 6:
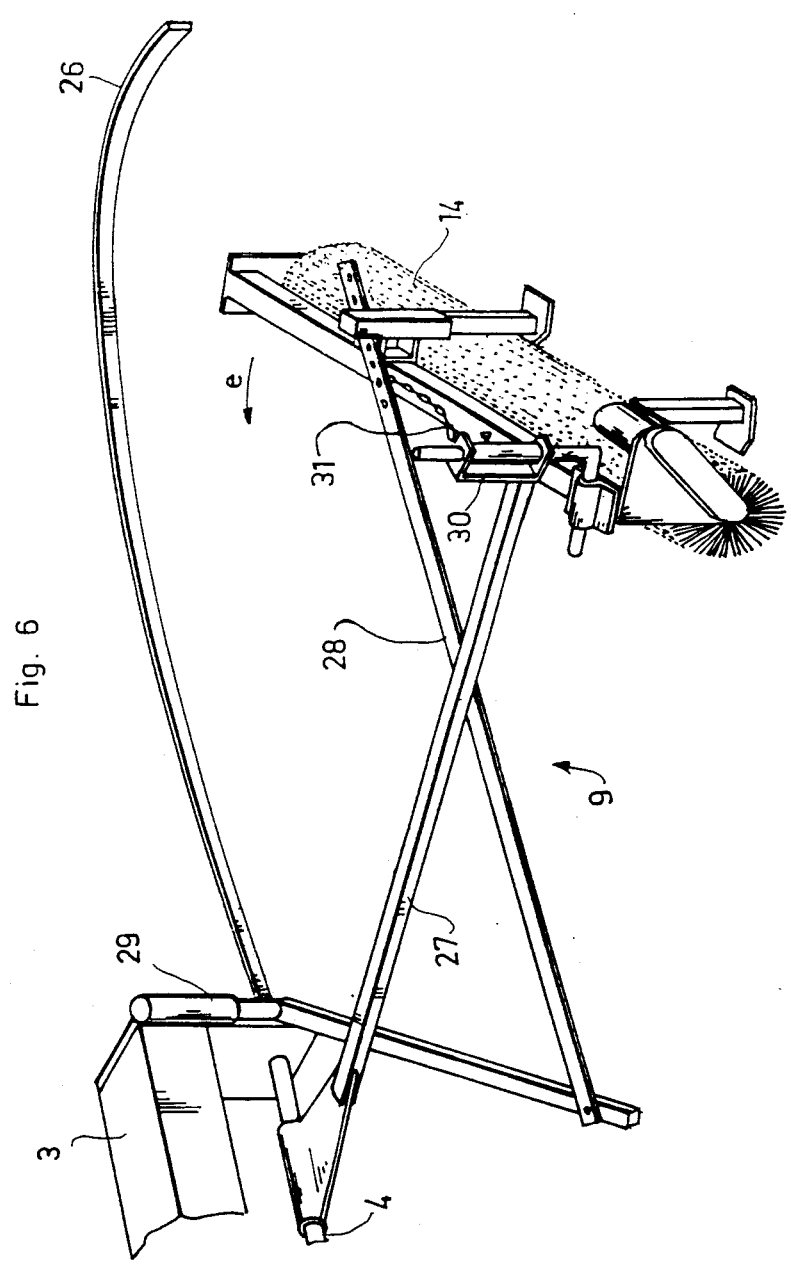
FIG. 6 is a perspective view from the rear showing the mounting of the retractable lateral brush.

The retractable brush 14 shown in FIG. 6 is supported by analogous means, with the exception of the following characteristics which make it retractable in the presence of a tree trunk. In the first place, it is provided with a curved bar 26 forming a sensor or probe. Moreover, it is associated with a supplementary link 28 in order to actuate it in a retracting movement. This link carries at its rear extremity the slide plate of the brush, and the sensor assembly 26/link 28 is articulated on the bar 3 by a vertical pivot 29 which gives it a freedom of pivoting transversely when the sensor 26 comes into contact with a trunk. The support bar of the brush 27 carries the brush 14 through a supplemental articulation 30 about a vertical axis in order to cause the pivoting of said brush. A chain 31 holds the assembly during lifting toward the transport position.

Figure 2:
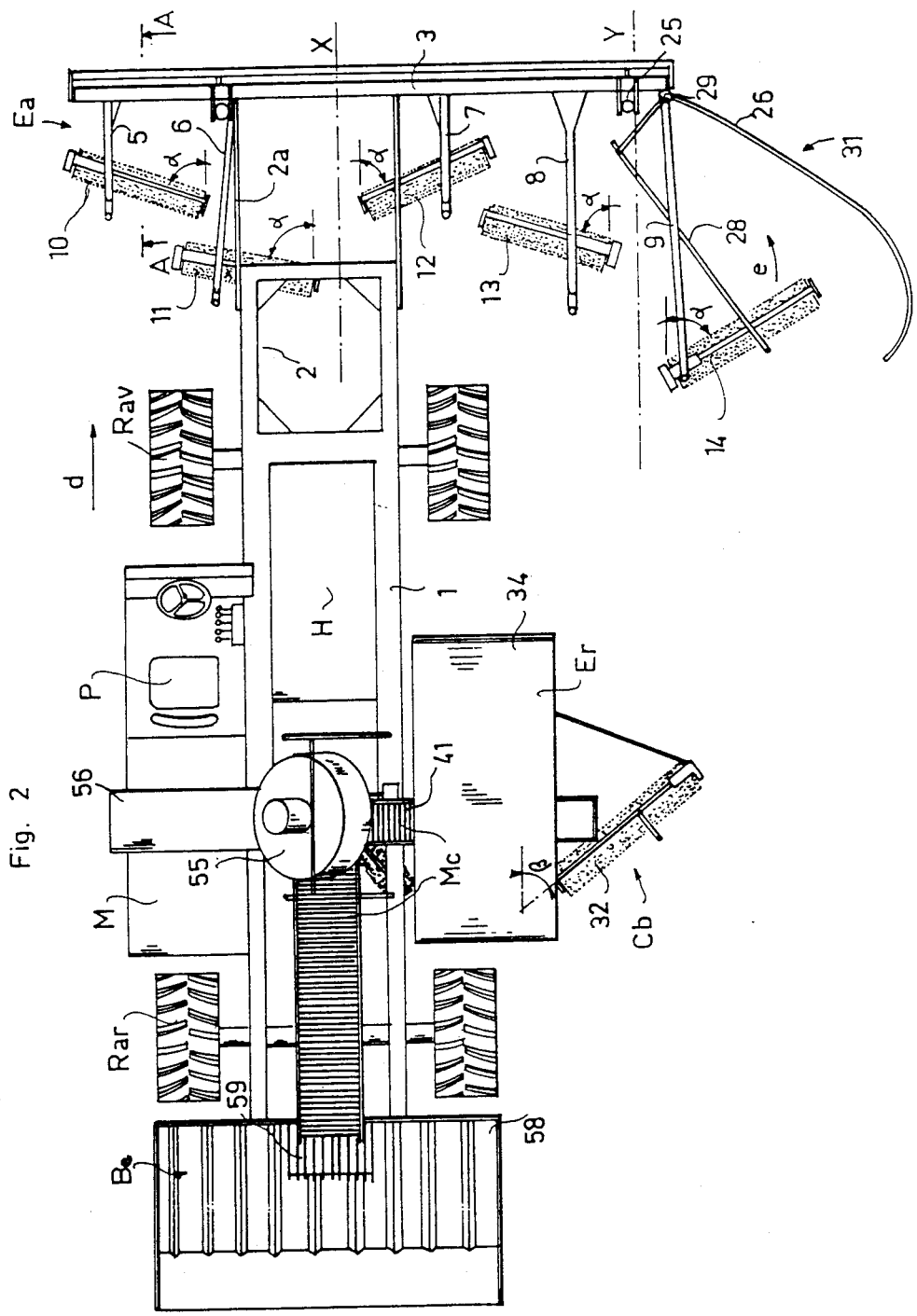
FIG. 2 is a schematic plan view.
Figure 3:
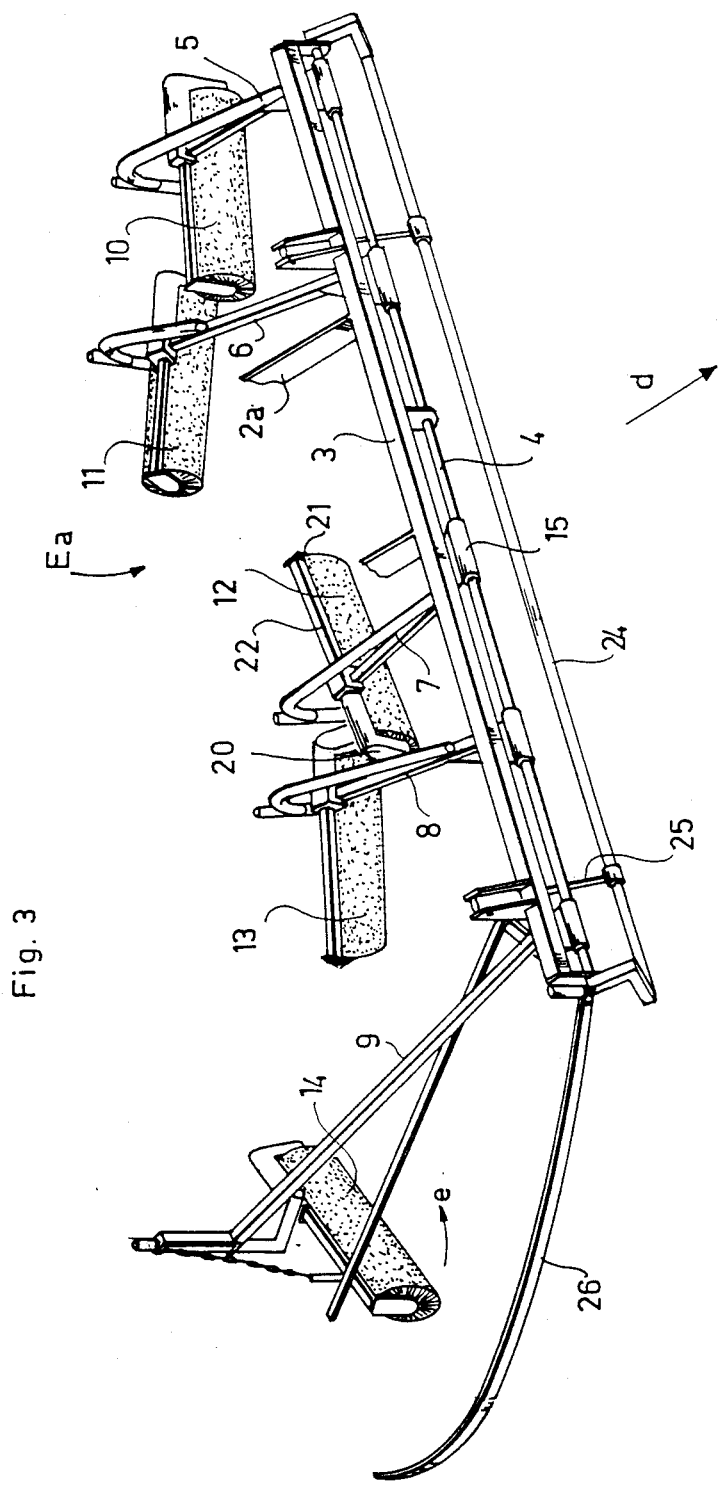
FIG. 3 is a partial perspective view of the leading part of the machine, carrying the five front projecting members.

As shown in particular in FIG. 2, the two lateral brushes 10 and 11 are arranged at an obliqueness or angle α with respect to the longitudinal direction which is the same direction for the two brushes and which is turned toward a longitudinal line X. These two brushes overlap at their contiguous edges.

The two central brushes 12 and 13 are provided with an inverse angle or obliqueness, one with respect to the other, the angle of the brush 13 toward a line Y situated on the other side. These two brushes overlap at the level of their contiguous edges and are also spaced from the adjacent brushes (respectively brush 11 and brush 14) to maintain two passages along lines X and Y.

The retractable lateral brush 14 has an obliqueness turned toward the line Y.

The angle of obliqueness α of these various brushes is of an absolute value essentially the same, comprising between about 50° and 80°, and preferably on the order of 70° for the leading brushes.

The hydraulic motors for the brushes are fed by the central hydraulic system H of the machine and are adapted to be able to assure the driving of the brushes in rotation at a range of speed between about 200 and 400 revolutions per minute. The direction of rotation is such that the bristles situated at the front have a raising movement (arrow r shown in FIG. 4.)

When the machine advances in the direction indicated by the arrows -d- in the drawings (a speed of advance of about 1 to 5 km/h), the leading brushes 10–14 project the fruit along the length of the machine and produce two windrows along lines X and Y. The projecting is caused by the impulses which the bristles impart to each fruit during their rotation, impulses which cause the fruit to roll on the ground for accumulating the fruit along only two paths X and Y running along the length of the machine. The rear elements of the machine which come into contact with the ground (wheels, skid plates) are understood to be positioned outside of these lines of accumulation. In particular the two left wheels are situated to the rear of the lateral brushes 10 and 11 in order to be hidden thereby, however the right wheels and the slide plates are positioned to the rear of the central brushes 12 and 13 and hidden thereby. It should be noted that the retraction of the lateral brush 14 is carried out in the direction of the arrow -e- shown in the drawings (tending to reduce the angle α), such that the fruits are always propelled toward the line Y.

The machine also comprises, to the rear of the assembly described above, two rear brushes 32 and 33 which cooperate with a receiving belt 34. These means are shown in detail in FIGS. 7, 8 and 9, respectively in a simplified top view, in transverse cross-section and in longitudinal cross-section.

Each rear brush 32 or 33 is identical to the front brushes, driven in the same manner by a hydraulic motor and provided with a skid plate. These rear brushes are carried at one side or the other of the receiving belt by the chassis thereof with inverse obliqueness so that the fruits are directed toward the belt. The angle of obliqueness β of these brushes with respect to the direction of displacement is the same in absolute value and comprises between about 35° and 65°, and preferably on the order of 55°.

These rear brushes 23 and 33 are arranged along the lines X and Y so as to direct all of the fruit accumulated by the leading brushes along these two lines.

The receiving belt is provided with a chassis 35 comprising two supports and a beam connecting four transverse axles which carry eight guide and drive pulleys for the belt such as 36. These pulleys cooperate with the lateral flanges between which the belt extends. This has transverse elements such as 37 for retaining the fruits, and which form a plurality of pockets. Preferably, the bottoms of these pockets are perforated by openings of sizes adapted to permit the passage of dirt and foreign bodies, while retaining the fruit.

The belt guided by the pulleys 36 is formed of four sections: a lower active section 34i which cooperates with the brushes 32 and 33, a rising section 34a which lifts the fruit toward a receiving hopper 38, an upper return section 38, and a descending section 34d.

Figure 9:
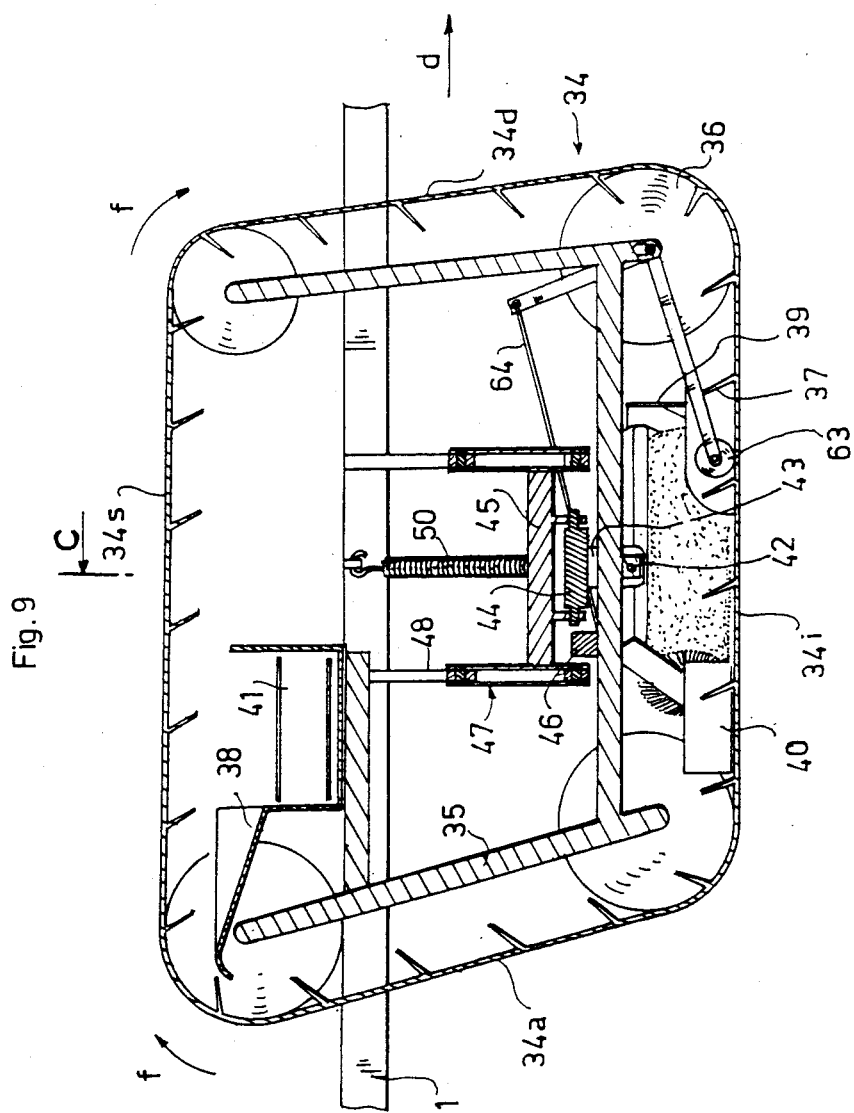
FIG. 9 is a longitudinal sectional view along line D of the same assembly.

One of the shafts which carry the two pulleys is rotatably driven by a hydraulic motor (not shown) adapted to drive the pulley in the direction of the arrows f shown in FIG. 9 such that the active section 34i has a direction of travel opposite to the direction of displacement -d- of the frame, the relative speed of travel of the belt with respect to the frame being equal in absolute value to the speed of displacement of the machine in such a manner that the active section 34i which is intended to rest on the ground when in the working position rolls without sliding thereon. Two tensioning rolls such as 63 are articulated on the shaft of the lower leading pulleys, in order to urge the belt onto the ground in the zone in which the fruits are loaded thereon. These tensioning rolls are resiliently urged by elastic tensioners or springs such as 64.

Figure 7:
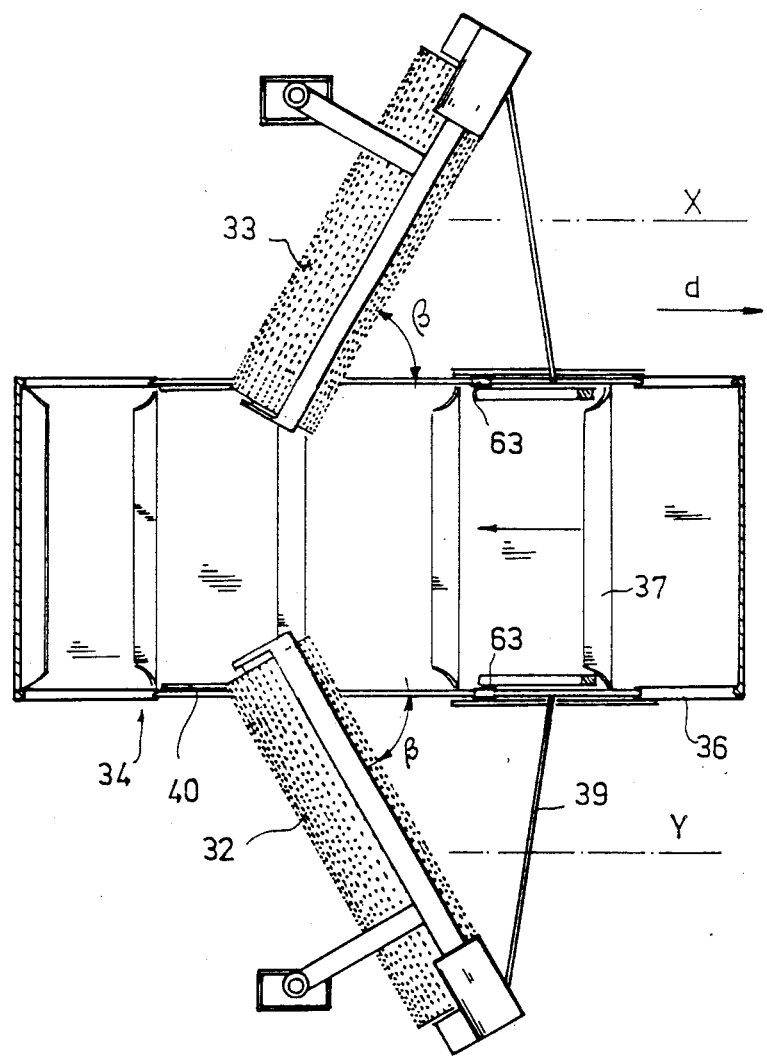
FIG. 7 is a detail view of the bottom of the two rear brushes cooperating with the receiving belt.

The brushes 32 and 33 are carried by the chassis 35 of the belt through a transverse member 46 so that when the active section rests on the ground, their bristles pass close to the ground (1.5 to 2 cm for the leading brushes for plums). The rear edge of these brushes overlaps the lateral edges of the belt as shown in FIG. 7, in such a manner as to guide the fruit to the belt. The transverse elements 37 of the belt are preferably notched at the edges in order to permit the free rotation of the brushes without excessive wear.

Further, flexible flaps such as 39 are preferably provided on each side of the active section of the belt in order to limit the zone of projection of the fruit. Each flap 39 extends between the leading part of the active section and the leading edge of the corresponding brush (FIG. 7). To the rear of each brush, a flexible guide flap 40 may also be provided for preventing a lateral overflowing of the fruits, while the rear pulleys have solid plates for the same purpose.

The receiving belt 38 is secured on an extension of the chassis 35 and contains a short transverse conveyor 41 for the transfer of the fruit falling thereon. The inlet of this belt is arranged to extend into proximity with the transverse blades 37 at the point of changing direction, so as to recover all of the fruit which fall thereon.

Figure 8:
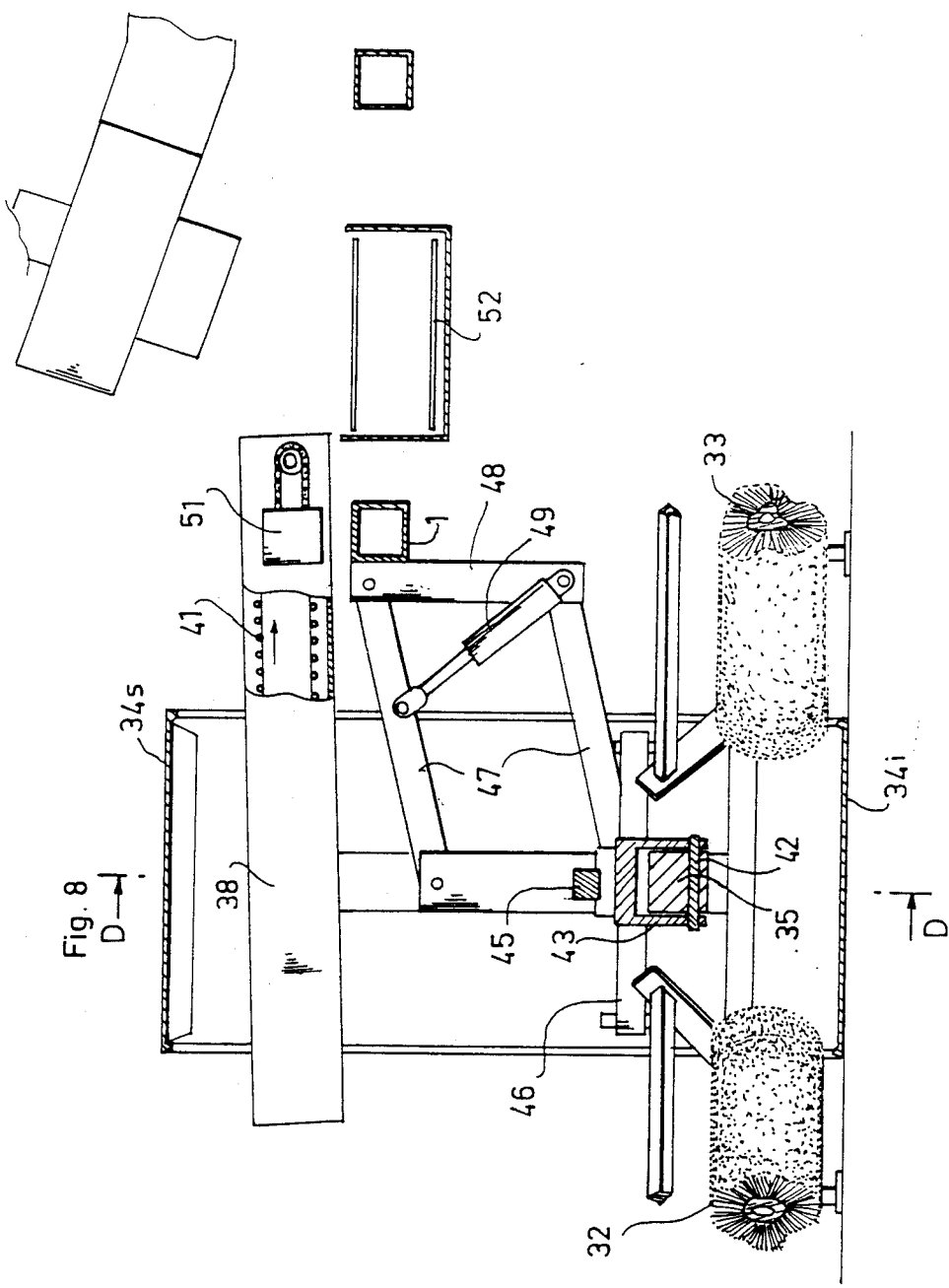
FIG. 8 is a partial transverse sectional view along line C showing the receiving belt, its lifting means and the rear brushes.

The chassis 35 of the belt is carried by a hydraulic lifting apparatus through a double articulation as shown in FIGS. 8 and 9, respectively in transverse cross-section and longitudinal cross-section. The stringer of the chassis 35 is first articulated about a transverse axis 42 which is carried by a U-shaped support 43. This support 43 is in turn articulated about a longitudinal axis 44 which is carried by a beam 45.

The latter is suspended at its extremities by two deformable parallelograms such as 47 which are articulated on two mounting brackets such as 48 secured to the frame 1 of the machine. Two hydraulic cylinders such as 49 permit vertically displacing the beam 45 in order to position the receiving belt either in the working position with its active section on the ground, or in a raised position (transport position). An equalizing spring 50 balances a portion of the weight of the belt and reduces the force of the belt against the ground. The double articulation, longitudinal (axis 44) and transverse (axis 42) by which is suspended the chassis of the belt from the beam 45 provides the belt with ease of transverse pivoting ahead of the rear, and permits it to precisely follow the ground.

Figure 10:
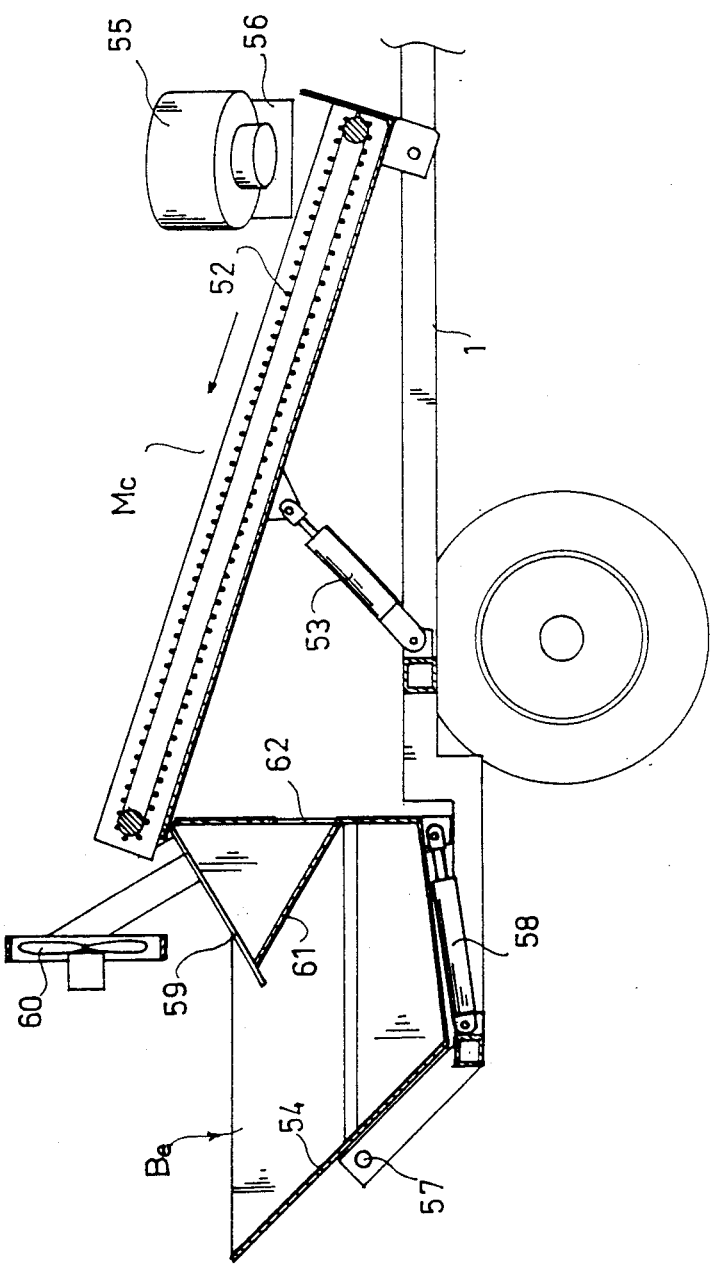
FIG. 10 is a partial longitudinal sectional view showing the longitudinal conveyor and the rear container.

The transverse conveyor 41 is driven by a hydraulic motor 51 and discharges the fruit on the side of the belt of a longitudinal conveyor 52 which is shown in particular in FIG. 10. This conveyor 52 is driven by a hydraulic motor (not shown). It is articulated on the frame 1 and supported by a cylinder 53 which permits arranging it either in a working position with its rear extremity situated above a container 54 (FIG. 10) or in a raised position in order to free the space above said container for emptying the same.

In the discharge zone between the two conveyors 41 and 52 are arranged suction means 55 of a conventional type, which removes foreign bodies and rejects them through a chute 56 on the side of the machine.

The rear hopper 54 is pivoted to the rear of the chassis by pins 57 and a cylinder 58 causes a pivoting for emptying the crop.

The container includes a vibrating grill 59 which is situated beneath the end of the longitudinal conveyor 52 when it is in the working position. This grill is formed of spaced bars in such a manner as to retain the fruit but allow dirt and debris to fall through. In the embodiment shown, it is caused to vibrate due to a fan 60 which is mounted above, and which has an unbalanced rotation by reducing the weight of one vane (or by removing one blade). Directly below the grill, the container comprises debris removal means, comprising in the emobodiment a chute 61 with an opening 62.

Figure 11:
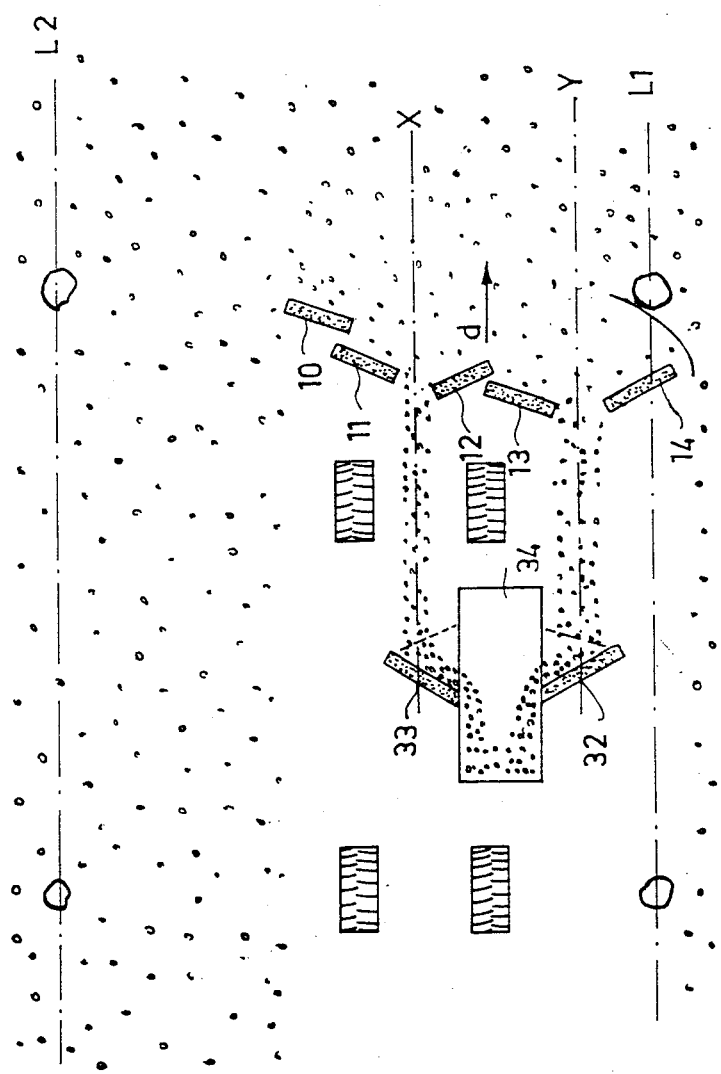
FIG. 11 is a schematic view illustrating the carrying out of the harvesting process.

The schematic of FIG. 11 shows the machine during a harvesting operation. It progresses in the direction -d- near a row of trees $L_1$ and covers a width slightly greater than half of the width between two rows of trees. By the impulses exerted on each fruit during their rotation, the five leading brushes 10-14 cause the fruit to roll on the ground and directs them into two lines X and Y forming two windrows which are received by the rear brushes 32 and 33. These direct the fruit onto the belt 34 of which the active section is positioned on the ground with a relative speed of zero with respect to the ground. These fruit are then conveyed toward the rear hopper, via the belt, the transverse conveyor and the longitudinal conveyor. They are freed of dirt and foreign bodies at three points: first, in the perforated cups of the belt, then by the action of the aspirator 55, and finally when arriving on the vibrating grill 59.

The machine according to the invention permits achieving a complete harvest without damaging the fruit, even fragile fruit.

I claim:

1. An agricultural machine for harvesting fruit or similar articles scattered on the ground, comprising:
   a frame (1) including ground engaging wheels and displacement means for displacing the frame in a direction (d),
   a plurality of rotating projecting members (10–14, 32, 33) of an elongated form, carried by the frame in such a manner as to be positioned in the vicinity of the ground in a direction oblique to the direction of displacement (d),
   means (2) for rotatably driving each projecting member, able to drive its periphery with a movement (r) assuring the projection of the fruit toward the front,
   a receiving belt (34) carried by the frame and having an active section (34i) situated at the side of the rear edge of one or more of the projecting members in such a manner as to extend below and longitudinally beyond said members,
   means for driving the receiving belt so as to confer upon its active section (34a) a direction of displacement opposite to the direction of displacement of the frame, and means (41, 52) for conveying the fruit from the receiving belt toward a hopper (54), said machine further comprising a first line of front projecting members (10-14), arranged along a predetermined width with an overlap at their ends with the exception of two passages (X, Y) arranged to cause the formation of two windrows, and a second line comprising two rear rotating projecting members (32, 33) situated to the rear of each of said passages, the receiving belt (34) being situated between said rear members so as to cooperate with the edges of said rear rotating members, and to be hidden to the rear of the members of the first line of rotating members (12, 13), said wheels being positioned so as to be hidden behind the leading projecting members (10-13).

2. A machine as in claim 1, characterized in that each projecting member (10-14, 32, 33) comprises a brush formed of bristles secured to an axle parallel to the ground (19) and connected to a hydraulic drive motor (20).

3. A machine as in claim 2, in which each brush and its hydraulic motor is carried by a support (7, 16) articulated on the frame in order to be movable vertically and horizontally, said support being provided with a slide plate (18) adapted to come into contact with the ground in order to adjust the height thereof.

4. A machine as in claim 3, comprising hydraulic lifting means (24, 25) adapted to permit a vertical displacement of the brush supports.

5. A machine as in claim 2 characterized in that each hydraulic brush motor (20) is adapted to be able to assure a rotatable driving in a range of speeds between about 200 and 400 rpm.

6. A machine as in claim 2 in which each brush (10-14, 32, 33) is arranged in such a manner that its angle ($\alpha$, $\beta$) with respect to the longitudinal direction of displacement is between about 35° and 80°.

7. A machine as in claim 1, characterized in that it comprises at least four leading projecting members comprising two central members (12, 13) positioned with a curvature of their contiguous edges, these members having inverted obliqueness turned toward two longitudinal lines (X) and (Y) situated on opposite sides thereof, at least one lateral member (10, 11) spaced from the central members for forming one of said passages and of which the obliqueness is turned toward one of the longitudinal lines (X), and situated on the other side, at least one lateral member (14), spaced from the central members for forming the other passage and of which the obliqueness is turned toward the other longitudinal line (Y), the receiving belt (34) being situated to the rear of the two central members (12, 13).

8. A machine as in claim 7, characterized in that it comprises, on one side, two lateral collecting members (10, 11) of identical obliqueness and, on the other side one lateral member (14) arranged to be able to retract in the presence of a tree trunk, the frame (1) having four wheels, two situated to the rear of the two central members (12, 13) and the other two situated to the rear of the two lateral recovery members (10, 11).

9. A machine as in claim 8, characterized in that the retractable projecting member (14) is articulated by its support in a manner as to be able to pivot transversely (e) and is associated with a curved bar (26) forming a sensor, able to cause the pivoting of said member upon contact with a tree trunk.

10. A machine as in claim 1, characterized in that the driving means for the receiving belt is adapted to cause the active section of the belt (34a) to roll without sliding on the ground.

11. A machine as in claim 1, characterized in that the receiving belt (34) is provided with two flexible flaps (39) situated on each side of its active section (34i), each flap extending between the leading part of the section and the trailing edge of the rear projecting member (32, 33) in order to limit the zone of projection of the fruit.

12. A machine as in claim 1, in which the receiving belt (34) comprises four sections: a lower active section (34i), a rising section (34a), an upper return section (34s) and a falling section (34d), said sections being guided and driven by pulleys (36) associated with a hydraulic motor, said belt being adapted to form transverse pockets for holding the fruit, perforated by openings for the passage of dirt and foreign bodies.

13. A machine as in claim 12, characterized in that the receiving belt comprises a chassis (35) carried by a hydraulic lifting mechanism (47-49) adapted to permit vertical displacement thereof, said chassis being attached to said lifting mechanism by a double articulation about a longitudinal axis (44) and about a transverse axis (42) in such a manner as to be able to pivot transversely and ahead of the rear.

14. A machine as in claim 12, characterized in that the conveying means comprises a receiving hopper (38) arranged within the angle formed by the rising section (34a) and the upper section (34s) of the belt so as to recover the discharged fruit upon changing of direction, a short transverse conveyor (41) adapted to receive the harvested fruit in said hopper and to direct the fruit transversely, a longitudinal conveyor (52) adapted to receive the fruit at the end of the transverse conveyor and to transport them to a container (54) situated to the rear, and means for driving said transverse and longitudinal conveyors.

15. A machine as in claim 14, characterized in that it comprises suction means (55) adapted to remove foreign bodies between the transverse conveyor (41) and the longitudinal conveyor (52).

16. A machine as in claim 14, characterized in that the container (54) comprises a vibrating grill (59) situated under the end of the longitudinal conveyor (52) and adapted to retain the fruit and allow dirt to fall through, said container conprising beneath said grill evacuation means (61, 62) for eliminating dirt.

17. A machine as in claim 1, and having its own motor and four driving and steering wheels.

* * * * *